(12) United States Patent
Travaglini et al.

(10) Patent No.: US 6,888,339 B1
(45) Date of Patent: May 3, 2005

(54) BUS VOLTAGE CONTROL USING GATED FIXED ENERGY PULSES

(75) Inventors: Dominick F. Travaglini, Doylestown, PA (US); Frank A. Linkowsky, Jamesburg, NJ (US); John D. Bingley, Yardley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 45 days.

(21) Appl. No.: 10/406,825

(22) Filed: Apr. 3, 2003

(51) Int. Cl.[7] .............................. G05F 1/10; G05F 1/40
(52) U.S. Cl. ...................................... 323/222; 323/282
(58) Field of Search ................................ 323/220, 222, 323/226, 270, 271, 273, 275, 279, 282, 285, 288, 290

(56) References Cited

U.S. PATENT DOCUMENTS

| | | | |
|---|---|---|---|
| 5,528,087 A | * 6/1996 | Sibata et al. .................. 307/66 |
| 5,602,464 A | * 2/1997 | Linkowsky et al. ......... 323/272 |
| 5,675,240 A | * 10/1997 | Fujisawa et al. ............ 323/282 |
| 6,275,018 B1 | 8/2001 | Telefus et al. |
| 6,304,473 B1 | 10/2001 | Telefus et al. |
| 6,646,415 B1 | * 11/2003 | Nebrigic et al. ............ 320/107 |
| 6,756,769 B2 | * 6/2004 | Bucur et al. ................ 320/134 |

* cited by examiner

Primary Examiner—Matthew V. Nguyen
(74) Attorney, Agent, or Firm—McDermott Will & Emery LLP

(57) ABSTRACT

Voltage on a DC power bus is controlled using gated fixed energy pulses. The power bus includes a bus capacitor for storing charge and can have a varying load. A battery is provided for providing electrical power to the bus through a power boost circuit including a boost switch for selectively applying a pulse of a fixed amount of energy to the bus in response to comparison of the bus voltage and a first reference voltage. The power boost circuit can include a choke coil and a timer for establishing an on time and an off time for each pulse, the on time establishing the amount of energy to be delivered to the bus, and the off time allowing the energy to be delivered to the load. A shunt path including a shunt switch can be provided for shunting energy from the bus when the bus voltage reaches a second reference voltage higher than the first reference voltage. In a preferred embodiment, the shunt path shunts energy to the battery for recharging the battery.

19 Claims, 9 Drawing Sheets

(0 to 20 amp ramp load)

(5 to 15 amp step)

(0 to 20 amp step)

(1 to 11.5 amp step)

BUS VOLTAGE CONTROL USING GATED FIXED ENERGY PULSES

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates generally to voltage control of an electrical power bus, and more particularly the invention relates to bus voltage control when a variable load is connected to the bus.

In a number of applications, including communications satellites, a DC power bus is provided to power electrical circuitry. Bus capacitors are charged to a desired voltage by a battery and by solar cells, for example, to maintain the requisite voltage.

The bus capacitors must be periodically recharged to maintain a desired voltage range. Heretofore, bus voltage control circuitry has employed linear feedback to control the duty cycle, or on and off cycle, of energy pulses in response to varying bus voltage. See U.S. Pat. Nos. 6,275,018 and 6,304,473, for example. This can include variable pulse on and off times, and variable repetition times. As described in the '018 patent, control methodologies or strategies may be broadly classified into two categories including those with control frame and those without a control frame. To regulate an output voltage, a controller may be coupled to a signal proportional to the output voltage so that an error signal representing the difference between the current value of the output voltage and a desired level of output voltage can be generated. The controller then regulates the output voltage according to the error signal. This regulation is accomplished by controlling a power switch and a free-running oscillator for producing a drive signal to cycle the power switch on and off, wherein the power switch when coupled to a power source and cycled on and off defines a pulse of power to the load, and a controller regulates an output voltage at the load by varying the number of pulses of power occurring at the load over time.

The control frames can be of fixed length or variable length. Within a fixed control frame, the on and off states can define a pulse train of pulses having a duty cycle defined by the length of the pulse train with respect to the fixed frame control period wherein the controller varies the duty cycle to regulate the output voltage. In another embodiment, the on and off stage of the switch control combination are varied to remove randomly a necessary number of pulses from the pulse train within a fixed control frame. In another embodiment, the removal of a necessary number of pulses can occur at harmonics of the frequency defined by the fixed control frame.

If the control frame is variable, a number of alternate control strategies can be used including having the on state of the switch control combination occur within a fixed period in a variable control frame thereby resulting in a variable period of the off state. Alternatively, the off state of the switch control combination can occur within a fixed period with a variable control frame, resulting in a variable period for the on state. In yet another alternate embodiment, the periods for the on and off states can both be variable within a variable control period.

In an embodiment where there is no control frame, a technique called "prompt gating" is proposed. In these embodiments the controller determines, on a pulse by pulse basis, whether a pulse of power occurs at the output. All of these embodiments are complex in energy pulse control.

The present invention is directed to a power bus controller with simplicity of control.

BRIEF SUMMARY OF THE INVENTION

In accordance with the invention, bus voltage is regulated in response to a varying load by the application of fixed pulses of energy to the bus when bus voltage drops below a reference level. A simple comparator is used to trigger a programmable timer which provides a fixed on time and a fixed off time for the energy pulse. When the output voltage is below the reference level, a single fixed energy pulse is applied to the bus. The comparator continues to monitor the bus and apply subsequent fixed energy pulses as required, in effect modulating the wait time between energy pulses.

In applications where a continuous power supply, such as solar cells, is connected to the bus, a power shunt can be used along with a power boost to prevent over voltage on the bus. Thus, the bus voltage can be held within upper and lower voltage limits. In one embodiment, the power shunt can be used to recharge batteries when the bus load is low.

Importantly, no linear feedback mechanism is necessary since the comparator operates as a state machine. The power bus controller is inherently stable to any loading within the power limit of the controller. As the load decreases, so does the repetition time of applied fixed energy pulses, thus load transient will cause negligible change in output voltage. Output voltage ripple is determined by the energy packet size (e.g., watt-second) and bus capacitor size. Since there is no fixed frequency for the energy pulses, electromagnetic interference (EMI) noise is reduced. Power controllers can be readily used in parallel as required.

The invention and objects and features thereof will be more readily apparent from the following detailed description and appended claims when taken with the drawings.

DETAILED DESCRIPTION OF THE INVENTION

Figure 1A:
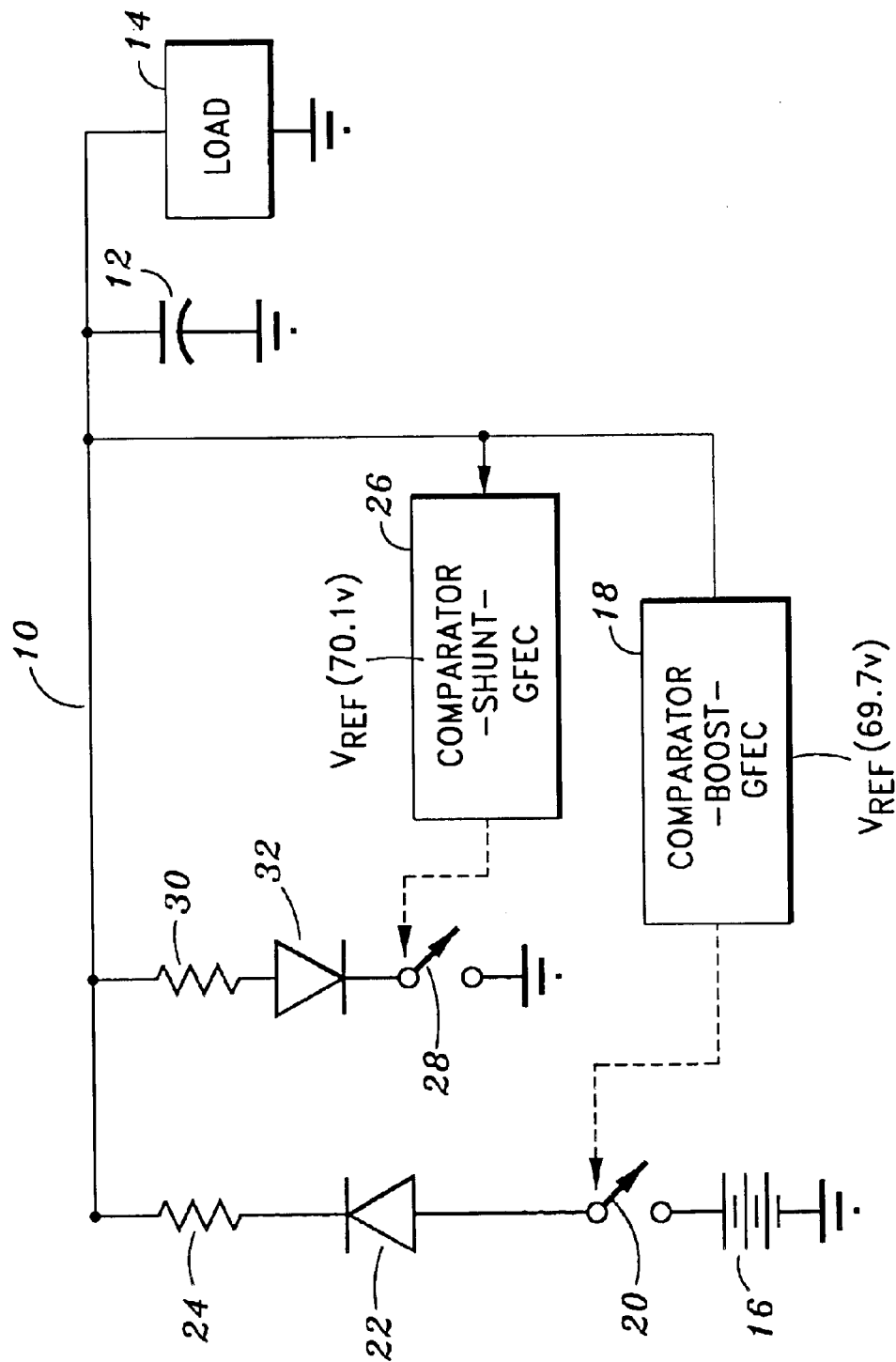
FIG. 1A is a functional block diagram of an electrical power bus and controller with power boost circuitry in accordance with an embodiment of the invention using gated fixed energy packets.

Referring to FIG. 1A, a functional block diagram is illustrated of a power bus controller or regulator in accordance with one embodiment of the invention. The bus shown at 10 has capacitors 12 which are charged to a desired voltage level for energizing a load 14. Load 14 can be electronic circuitry in a communications satellite, for example, which can vary from no load to a light load or a heavy load. Particularly in a satellite application, a power source such as solar cells (not shown) can be continuously connected to power bus 10 as a power supply. In addition, or alternatively, a battery 16 provides power to bus 10 as needed.

Figure 6:
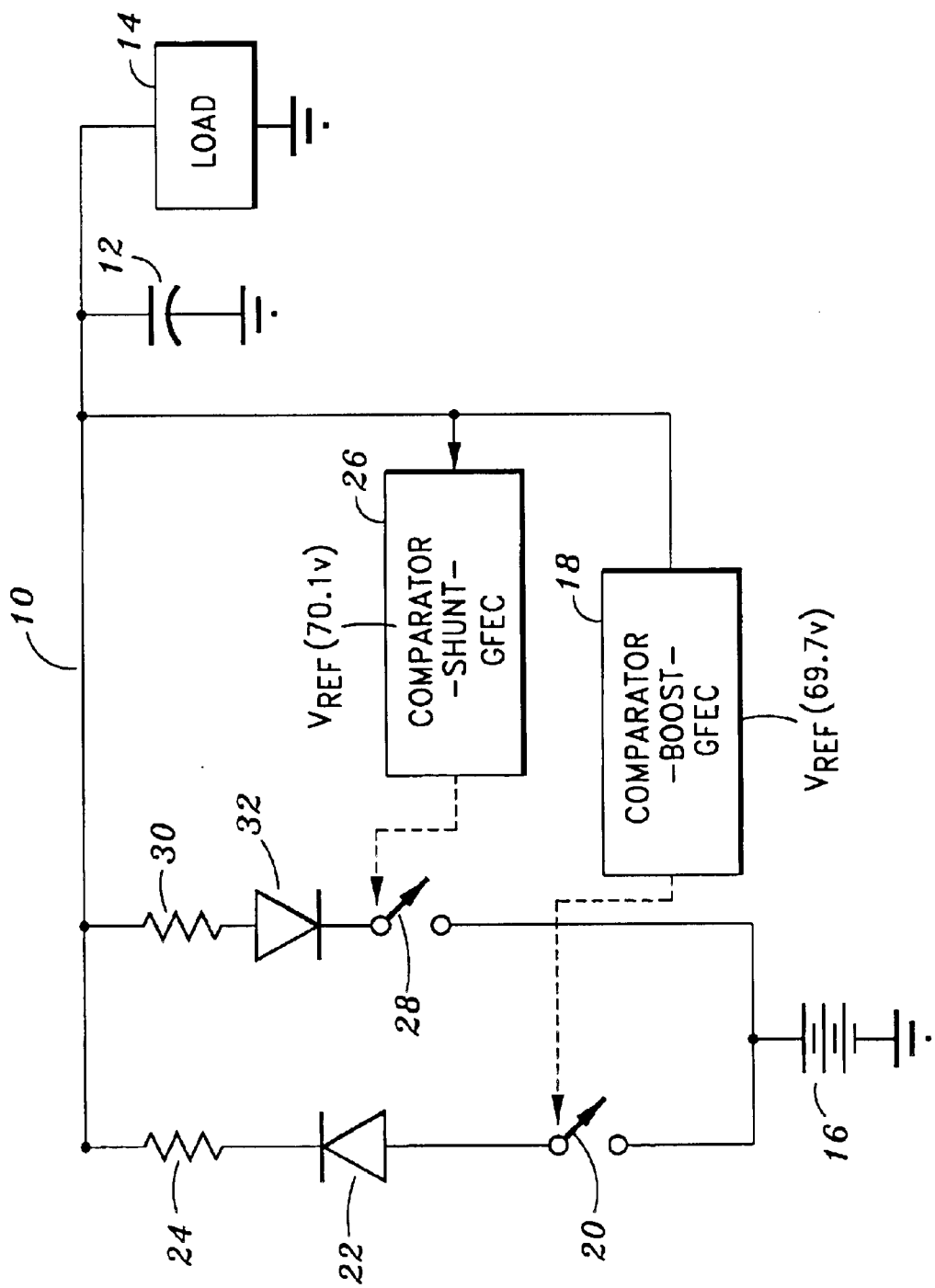
FIG. 6 is a functional block diagram of another embodiment of an electrical power bus controller using a gated fixed energy packet power boost and a power shunt for recharging batteries in accordance with the invention.

In this embodiment, the voltage on bus 10 is to be maintained between an upper voltage of 70.1 volts and a lower voltage of 69.7 volts. The lower voltage is maintained by a boost circuit 18 which includes a comparator for comparing voltage on bus 10 with a reference voltage (69.7 volts) and which controls a switch 20 for applying fixed energy pulses from battery 16 to bus 10 through diode 22 and RF choke 24 when the voltage on bus 10 drops to or below 69.7 volts. Additionally, in this embodiment a shunt circuit 26 compares bus voltage to a reference voltage (70.1 volts) and controls switch 28 when bus voltage exceeds the reference voltage. The gated fixed energy control allows energy pulses to be connected through a resistive coil 30 and diode 32 and switch 28 to a circuit ground to remove excess voltage. In an alternative embodiment illustrated in FIG. 6A, excess voltage on bus 10 is used to recharge battery 16 rather than the dissipation of excess energy to ground. Other elements of FIG. 6A are similar to the elements of FIG. 1A and have the same reference numerals.

Operation of comparators 18, 26 and the gated fixed energy control through switches 20, 28 is simple in implementation since the mechanism functions as a state machine in monitoring the voltage on bus 10. No complex feedback circuitry is required and there is no control of the duty cycle of each pulse as the pulses have a fixed energy content in watt-seconds. A timer for controlling the amount of energy can be programmable, but once programmed the energy pulses remain constant in application to or removal from bus 10. Thus when the output voltage on the bus is at or below the desired level (e.g., 69.7 volts) a single fixed energy pulse is applied to the bus through switch 20. When the bus voltage again drops to or below the reference level, another energy pulse can be applied to the bus. Thus, the comparator modulates the wait time between pulses as required to maintain a minimum bus voltage but without varying each fixed energy pulse. Similarly, shunt comparator 26 responds to a voltage on bus 10 being at or above a reference level (e.g., 70.1 volts) and connects a pulse of energy through switch 28 either to ground as in FIG. 1A or to battery 16 as in FIG. 6A. Again, a programmable timer can be used to provide a fixed on time and a fixed off time for each energy pulse, thus establishing the fixed energy content of the pulse, but once the pulse is defined, the gated fixed energy control applies or removes one or more fixed energy pulses as necessary to maintain the desired voltage range on the power bus.

Figure 1B:
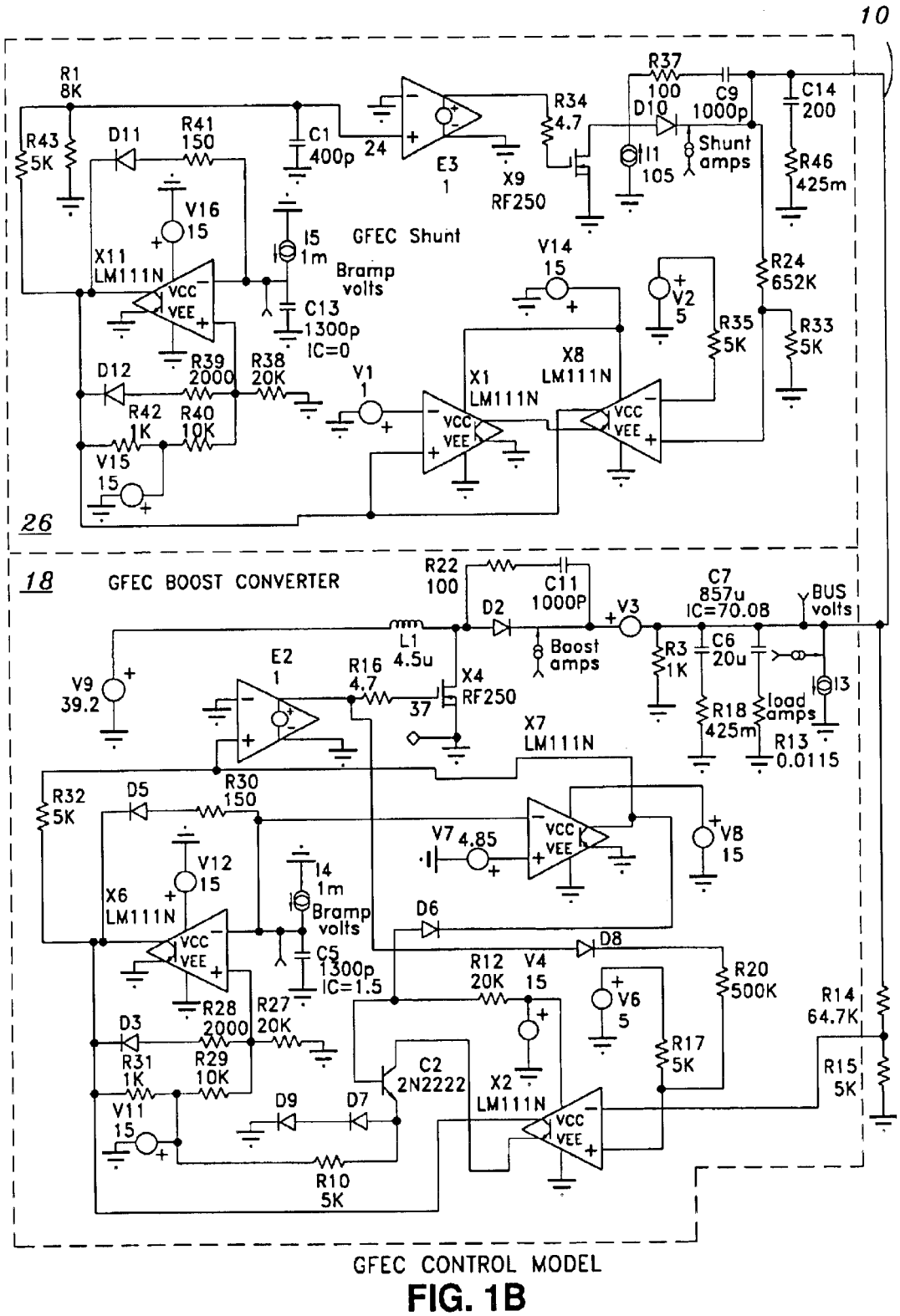
FIG. 1B is a schematic of the bus regulator of FIG. 1A.

FIG. 1B is a more detailed schematic of shunt circuitry 26 and boost circuitry 18 of FIG. 1A.

Figure 2:
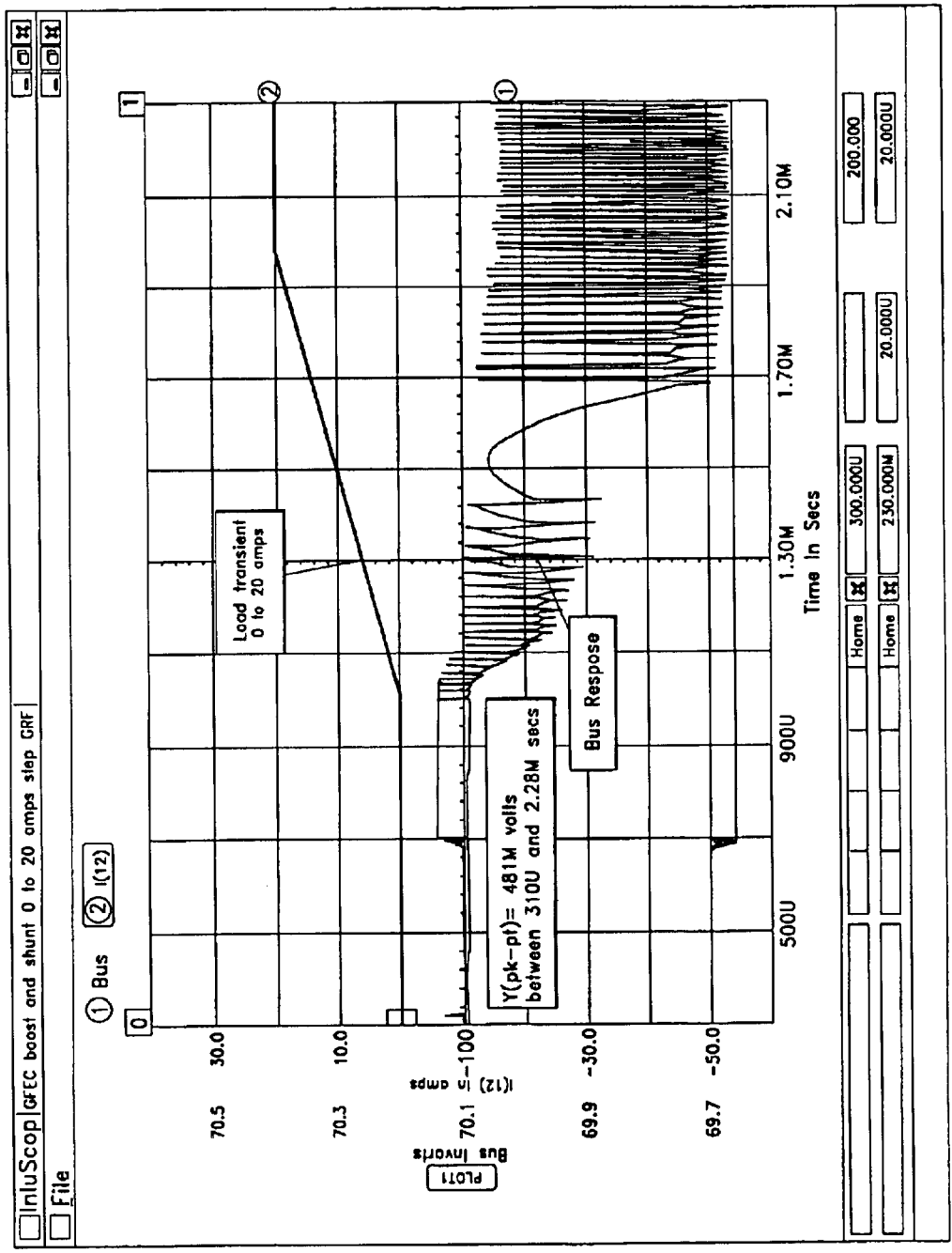
FIG. 2 is a graph illustrating bus response to a slowly varying load for the controller of FIG. 1B.

FIG. 2 is a graph illustrating bus response to a slowly ramping load for the bus controller of FIG. 1B. In this embodiment, the shunt is capable of removing up to 10.5 amperes from the bus, and the boost circuitry can add a peak current in each fixed energy pulse of 43 amperes. In the beginning of the voltage waveform, the shunt switch is on most of the time withdrawing energy from the unloaded bus. The bus voltage is residing at the shunt boundary of 70.1 volts. As the loading increases, the shunt reacts by shunting less and less energy until the load equals the shunt's capability of 10.5 amperes, and the trajectory of the bus voltage then heads toward the boost circuit boundary of 69.7 volts. Once the bus voltage hits the boost reference voltage, the boost circuit begins to put fixed packets of energy into the bus. As the load increases, the boost circuit increases its rate of delivering energy packets to the bus. The dominant ripple component is geared to the ESR of the bus capacitance. This is most dramatic for the boost circuit, since peak current is approximately 43 amperes as compared to the shunt maximum current of 10.5 amperes. The bus stays within the regulation window set up by the boundaries of the two converters. As a design constraint, the boundaries of the two converters must be wider than the ripple generated in the bus voltage to avoid the possibility of both converters operating concurrently.

Figure 3:
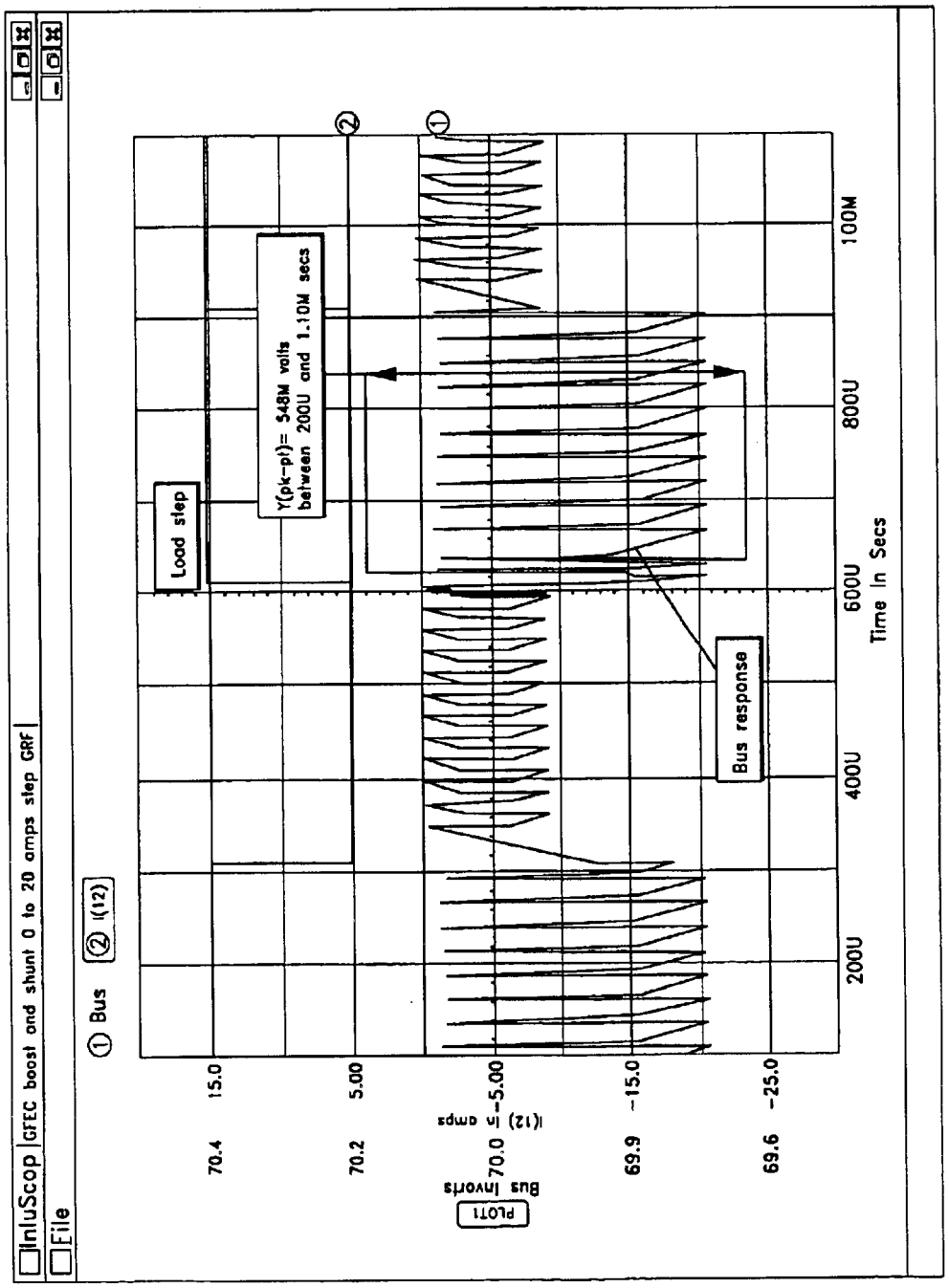
FIG. 3 is a graph illustrating response time for the controller of FIG. 1B.

FIG. 3 is a graph illustrating response time for the controller of FIG. 1B. In this simulation the converters are loaded in their mid power bands. Each converter is capable of supplying 10 amperes. The large spike in this wave form illustrates the effect when the two circuits operate concurrently. The shunt circuit is busy shunting energy while the boost circuit responds and then the shunt circuit ceases operation at the same time that the boost circuit sends energy to the bus. This causes the boost and shunt circuit ripples to stack and results in the high amplitude spike. This event is triggered by the load switching event, and it will be noted that there is a lack of over and under shoots at the load switching edges.

Figure 4:
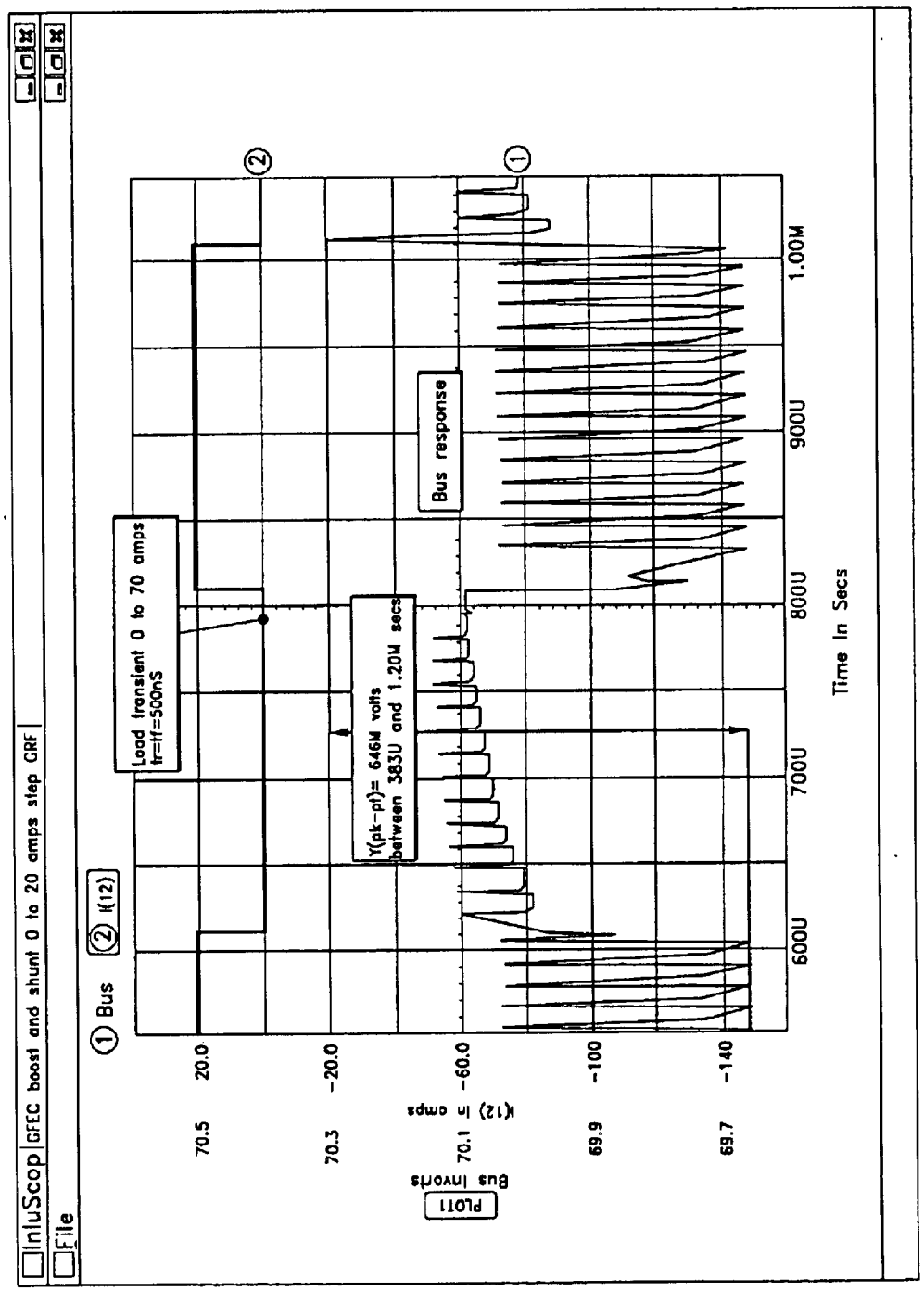
FIG. 4 is a graph illustrating controller response to extreme boundary loading with 500 nanoseconds (ns) transitions.

FIG. 4 is a graph illustrating controller response to extreme boundary loading with 500 ns switching of from 0–20 amperes. Again, it will be noted that there are no over and under shoots as is present in linear feedback systems. However, concurrent switching, load and boost can stack up the spike ripple. Here the boost circuit works hardest since it must pick up the slack from the shunt which can contribute only 10.5 amperes.

Figure 5:
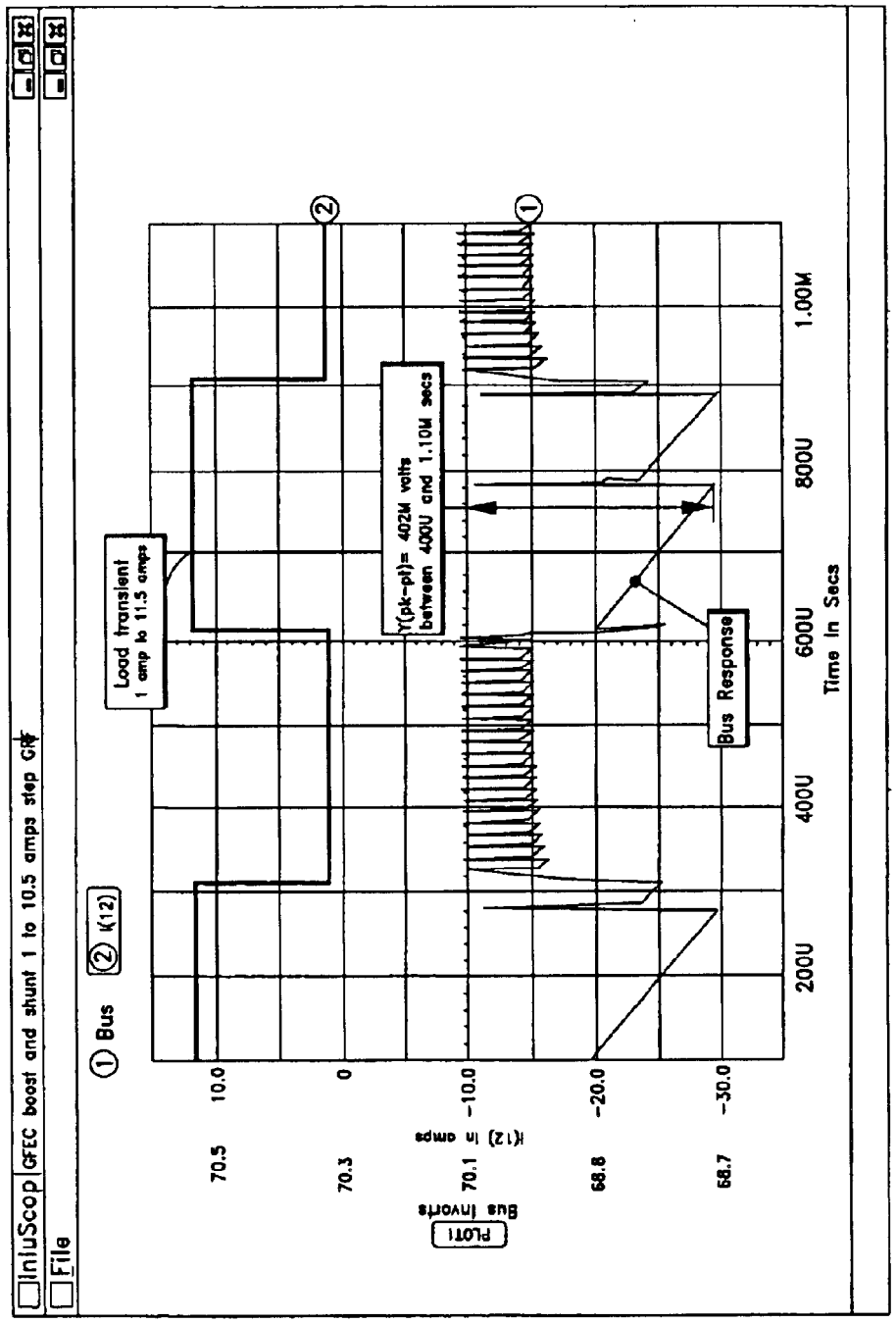
FIG. 5 is a graph illustrating controller response to switching of light loads on a bus.

FIG. 5 is a graph illustrating regulation response to switching of light loads (1–11.5 amperes) on the bus. Here the boost circuit has modest operation while the shunt circuit must continue to do most of the work in maintaining the bus voltage between the reference levels. For the 10 ampere relatively hard step, the bus does not experience overshoots. Further, no stacking of transients is present with the switching of light loads.

Figure 7:
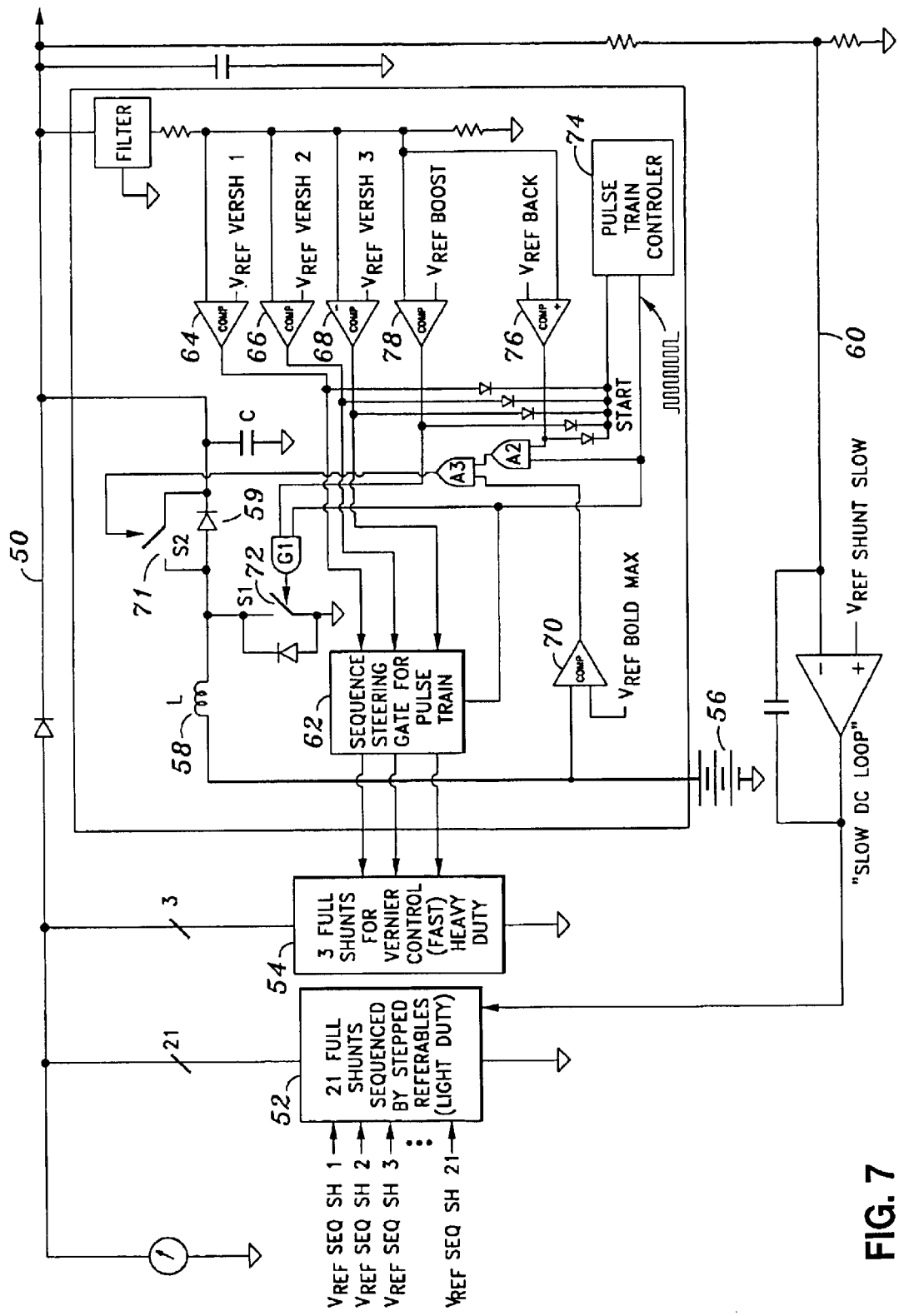
FIG. 7 is a more detailed schematic of the bus controller of FIG. 6, which uses a plurality of shunt circuits and boost circuits.

In accordance with a feature of the invention, a plurality of shunt circuits and a plurality of boost circuits can be used in parallel as required for greater loads on the bus. FIG. 7 is a schematic of a boost and shunt regulator similar to the regulator of FIG. 6, in which 24 shunt circuits are employed, including 21 shunt circuits 52 which can be sequenced in steps for light duty and three shunts 54 which can be sequenced for heavy duty. In this embodiment a single boost circuit is provided for applying fixed energy pulses from battery 56 through coil (L) 58 and diode 59 to bus 50. A high gain, low bandwidth DC loop 60 controls shunts 52 to keep the bus voltage regulated to a band that is adjusted to be higher than the buck ripple band. Control of the heavy duty shunts 54 of by sequential steering gate for pulse train 62, which in turn responds to three comparators 64, 66, 68 for three full shunts 54 with each comparator tripped at an appropriate bus voltage to initiate a pulse train and directed to the proper shunt 54 via the sequential steering gate block 62.

When the voltage of battery 56 drops below a reference level as determined by comparator 70, excess voltage on bus 50 can be used to recharge battery 56 by the closing of switch 71 and the opening of switch 72. Control of the switches is effected through a gate network (G1, G2, G3) which enable a pulse train from pulse train generator 74. If the shunt comparator 76 determines that the bus voltage is going above the desired regulation point, the output of comparator 76 enables pulse train generator 74 via the OR'ED start input and simultaneously opens gate G2. Gate G3 is always open as long as the battery voltage is less than the maximum voltage allowed. When the battery has reached its fully charged voltage, gate G3 closes, thereby terminating battery charge. Charge rates can be varied by artificially limiting the packet repetition rate or the current peaks in the packets. Pulse train generator 74 determines when packets of energy can be applied to or extracted from bus 50.

Figure 8:
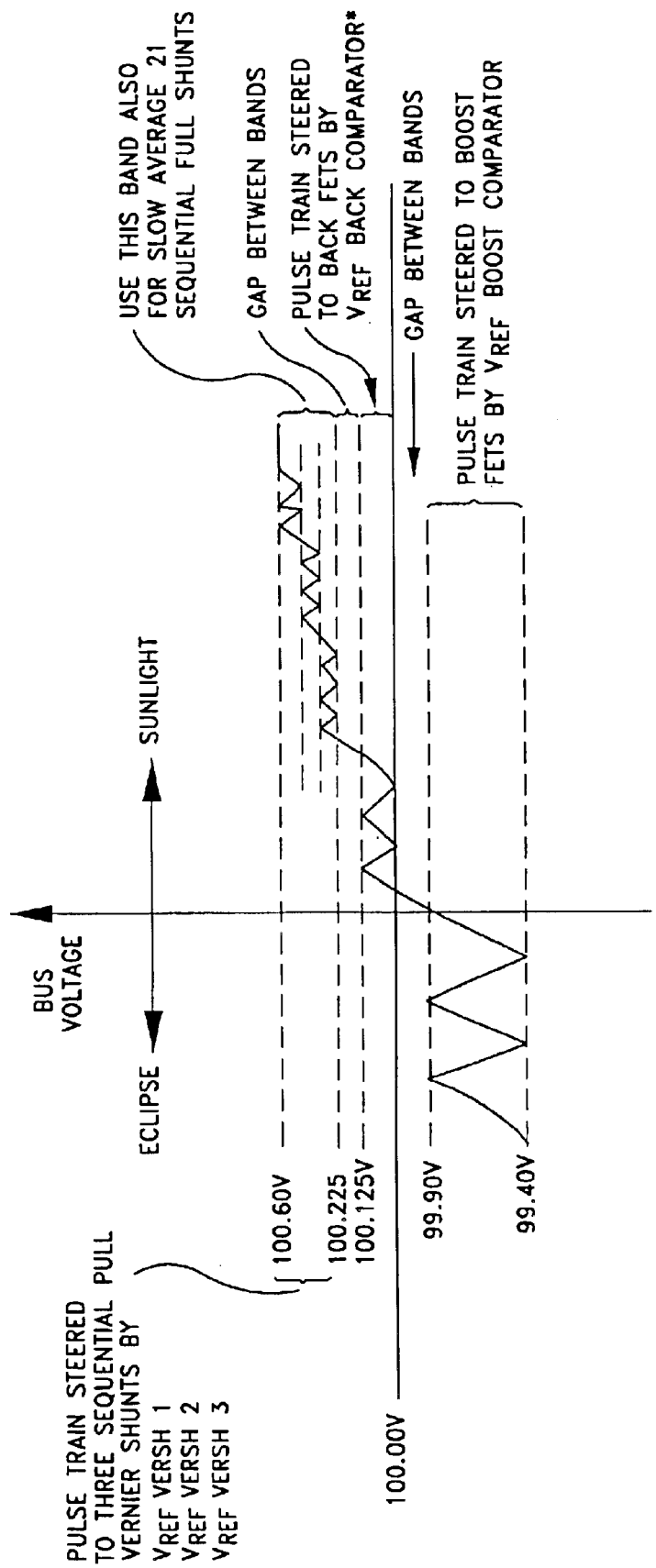
FIG. 8 is a graph illustrating operation of the controller of FIG. 7.

As with the Vref boost comparator 70, the Vshunt reference comparator 76 can be adjusted to place a ripple caused by the buck switch energy package anywhere with respect to the desired regulation point. To facilitate the bidirectional operation of the boost and shunt packet systems, ripple caused by the boost should be adjusted to be below the desired shunt regulation point, and ripple caused by the shunt should be adjusted to be above the desired boost regulation point. Assuming 0.5 volt peak to peak for the boost, 0.125 volt peak to peak for the shunt, and a 0.1 volt spacing between the voltage levels, the operating system can be illustrated as shown in FIG. 8. Here the shunt ripple is assumed to be 25% of the boost ripple based on the lower charge rate that may be required in a spacecraft. FIG. 8 illustrates the operating bands for the 21 sequenced full shunts 52 (light duty) and the three full shunts 54 for heavy duty. The three full shunts are used for vernier control and are used in order to shunt varying numbers of packets of bus energy to ground, as controlled by comparators 64, 66, 68.

There has been described a power bus controller for applying or extracting fixed energy pulses from the bus as determined by a simple comparator. The energy content of each pulse can be determined by a programmable timer which is triggered by the comparator. The on time provides for a fixed amount of energy in each pulse and the off time allows for the fixed amount of energy to be delivered to the bus load. The controller is inherently stable to loading and has relatively flat efficiency versus load. As load decreases, so does the repetition rate of energy pulses. Output voltage ripple is determined by the energy packet size (watt seconds) and output capacitor size.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A method of maintaining a voltage on a DC power bus having an electrically charged bus capacitor and a varying load comprising the steps of:
   a) providing a source of electrical power;
   b) connecting the source of electrical power to the bus through a charging path including a boost switch;
   c) comparing voltage on the bus to a first reference voltage;
   d) controlling the boost switch to apply a pulse of a fixed amount of energy from the source of electrical power to the bus in response to the comparing voltage on the bus to the first reference voltage; and
   e) providing a shunt path including a shunt switch for shunting electrical energy from the bus when bus voltage reaches a second reference voltage higher than the first reference voltage.

2. The method as defined by claim 1 wherein in step b) the charging path includes, a choke coil.

3. The method as defined by claim 2 wherein step d) includes the use of a timer for establishing on time and off time for each pulse, the on time establishing the amount of energy to be allowed to the bus, the off time allowing the energy to be delivered to the load.

4. The method as defined by claim 3 and further including the steps of:
   f) comparing the voltage on the bus to the second reference voltage; and
   g) controlling the shunt switch to remove energy from the bus in response to the comparing of voltage on the bus to the second reference voltage.

5. The method as defined by claim 4 wherein step g) includes applying a pulse train through gate circuitry to the shunt switch, the gate circuitry being responsive to step f) and allowing the pulse train to actuate the shunt switch.

6. The method as defined by claim 4 wherein step e) includes providing a plurality of shunt paths and shunt switches which are selectively closed to remove energy from the bus depending on bus load.

7. The method as defined by claim 1 and further including the steps of:
   f) comparing the voltage on the bus to the second reference voltage, and
   g) controlling the shunt switch to remove energy from the bus in response to the comparing of voltage on the bus to the second reference voltage.

8. The method as defined by claim 7, wherein step g) includes applying a pulse train through gate circuitry to the shunt switch, the gate circuitry being responsive to step f) and allowing the pulse train to actuate the shunt switch.

9. The method as defined by claim 7, wherein step e) includes providing a plurality of shunt paths and shunt switches which are selectively closed to remove energy from the bus depending on bus load.

10. The method as defined by claim 4, wherein the shunt path shunts energy to the source of electrical power.

11. A regulated DC power bus comprising:
    a) a bus with DC voltage for a varying load and including a bus capacitor for storing charge,
    b) a battery for providing electrical power to the bus,
    c) a first comparator for comparing voltage on the bus to a first reference voltage,
    d) a power boost circuit including a boost switch for selectively applying a pulse of a fixed amount of energy from the battery to the bus in response to the first comparator, and e) a shunt path including a shunt switch for shunting energy from the bus when the bus voltage reaches a second reference voltage higher than the first reference voltage.

12. The regulated DC power bus as defined by claim 11, wherein the power boost circuit includes a choke coil.

13. The regulated DC power bus as defined by claim 12, and further including:

f) a second comparator for comparing the voltage on the bus to the second reference voltage, and g) a controller for the shunt switch whereby energy is removed from the bus in response to the second comparator.

14. The regulated DC power bus as defined by claim 13 and further including:

h) a pulse train generator for applying a pulse train through gate circuitry to the shunt switch, the gate circuitry being responsive to the second comparator and allowing the pulse train to actuate the shunt switch.

15. The regulated DC power bus as defined by claim 14 and further including a plurality of shunt paths including shunt switches for shunting energy from the bus depending on bus voltage and load.

16. The regulated DC power bus as defined by claim 11 and further including:

f) a second comparator for comparing the voltage on the bus to the second reference voltage, and g) a controller for the shunt switch whereby energy is removed from the bus in response to the second comparator.

17. The regulated DC power bus as defined by claim 16 and farther including:

h) a pulse train generator for applying a pulse train through gate circuitry to the shunt switch, the gate circuitry being responsive to the second comparator and allowing the pulse train to actuate the shunt switch.

18. The regulated DC power bus as defined by claim 14 and further including a plurality of shunt paths including shunt switches for shunting energy from the bus depending on bus voltage and load.

19. The regulated DC power bus as defined by claim 13, wherein the shunt path shunts energy to the battery.

* * * * *

UNITED STATES PATENT AND TRADEMARK OFFICE
CERTIFICATE OF CORRECTION

PATENT NO.   : 6,888,339 B1
DATED        : May 3, 2005
INVENTOR(S)  : Dominick F. Travaglini et al.

It is certified that error appears in the above-identified patent and that said Letters Patent is hereby corrected as shown below:

Column 6,
Line 19, "includes, a" should read -- includes a --.

Column 8,
Line 11, "farther" should read -- further --.

Signed and Sealed this

Second Day of August, 2005

JON W. DUDAS
*Director of the United States Patent and Trademark Office*